United States Patent [19]
Tadokoro et al.

[11] 4,315,488
[45] Feb. 16, 1982

[54] ROTARY PISTON ENGINE HAVING SUPERCHARGING MEANS

[75] Inventors: Tomoo Tadokoro; Haruo Okimoto, both of Hiroshima, Japan

[73] Assignee: Toyo Kogyo Co., Ltd., Hiroshima, Japan

[21] Appl. No.: 92,289

[22] Filed: Nov. 8, 1979

[30] Foreign Application Priority Data

Nov. 13, 1978 [JP] Japan ................. 53-139981
Nov. 13, 1978 [JP] Japan ................. 53-139982
Nov. 13, 1978 [JP] Japan ................. 53-139983

[51] Int. Cl.³ .................. F02B 53/06; F02B 53/08
[52] U.S. Cl. ...................... 123/213; 123/216
[58] Field of Search .......... 123/203, 213, 216, 219, 123/242

[56] References Cited
U.S. PATENT DOCUMENTS 3,977,368  8/1976  Yamaguchi et al. ......... 123/216 X

FOREIGN PATENT DOCUMENTS 1576194   5/1970  Fed. Rep. of Germany ...... 123/216
42-17324  2/1967  Japan ...................... 123/216
44-49491 10/1969  Japan ...................... 123/213
47-37721  9/1972  Japan ...................... 123/213
49-38212 10/1974  Japan ...................... 123/213
52-23621  5/1977  Japan ...................... 123/213

Primary Examiner—Michael Koczo, Jr.
Attorney, Agent, or Firm—Fleit & Jacobson

[57] ABSTRACT

Rotary piston engine having a main intake port in one side housing of the casing. The side housing is further formed with a supercharging air port which is connected with a supercharging passage leading from an air pump. The supercharging air port is so formed that it is opened substantially simultaneously with and closed later than the main intake port. A control valve may be provided in the supercharging passage to open the passage when the main intake port is substantially closed.

9 Claims, 5 Drawing Figures

F I G. 4
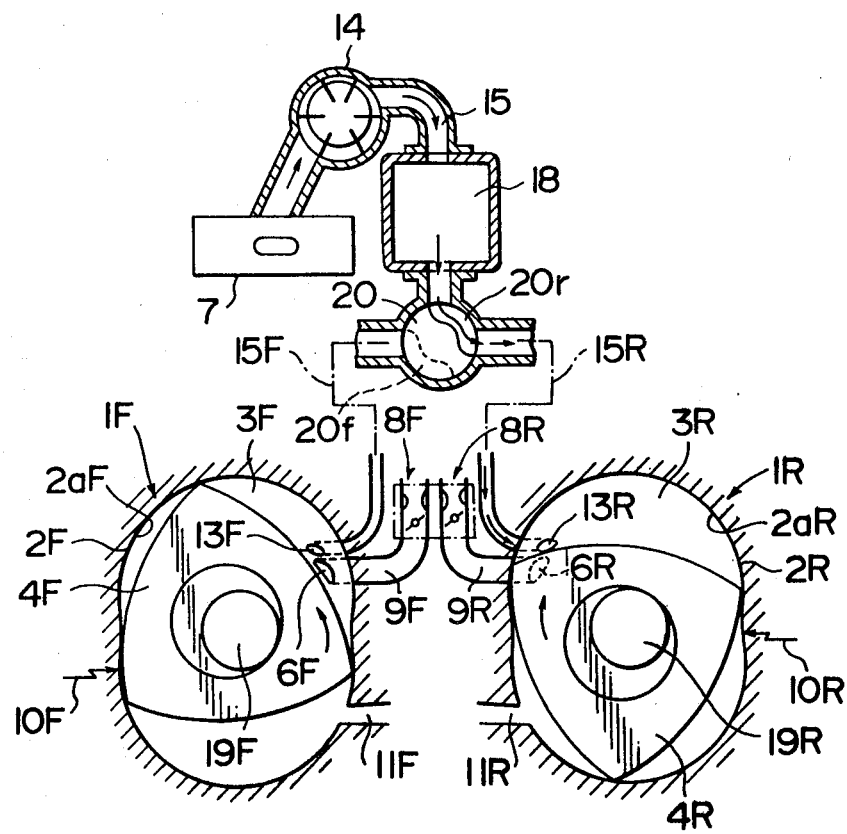
F I G. 5
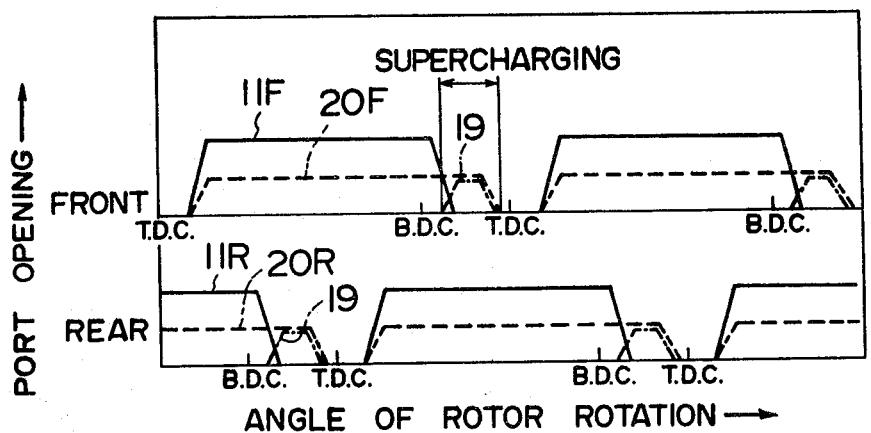

ROTARY PISTON ENGINE HAVING SUPERCHARGING MEANS

The present invention relates to rotary piston engines and more particularly to intake means for rotary piston engines. More specifically, the present invention pertains to intake means for rotary piston engines having supercharging means.

In general, in the field of internal combustion engines, it has been known to provide the intake system with a supercharger which functions to force the intake gas into the combustion or working chamber. In this type of intake system, however, problems have been encountered in that the supercharger is located in the intake passage so that the intake gas is totally passed through the supercharger and therefore the flow resistance of the intake passage is substantially increased resulting in a decrease in the engine coutput. Further, the intake gas is subjected to an adiabatic compression which causes an increase in the temperature of the gas, so that the density of the intake gas is correspondingly decreased and the charge of intake gas cannot be adequately increased. Thus, in conventional engines, in order to avoid the above problems, the supercharger must be of a substantial capacity.

In the field of rotary piston engines, it has already been proposed to provide an auxiliary or supercharging passage in addition to a main intake passage so that the flow of intake gas is not disturbed by the supercharger. For example, Japanese utility model publication No. 52-23621 discloses a rotary piston engine having an air pump for feeding a secondary air to the exhaust system to oxydize the unburnt constituents in the exhaust gas. The air pump is also connected through a control valve with a supercharging passage which opens at the intake port formed in the rotor housing. The air from the pump is thus forced into the working chamber when the control valve is opened.

This type of intake system is not however effective to provide an adequate supercharging function because in the overlapping period wherein an apex portion of the rotor is passing on the intake port there will be a substantial amount of blow back from the leading working chamber to the trailing work chamber. In order to solve the problem, the intake port may be displaced toward the trailing side. However, this solution is not preferable because such displacement of the intake port causes an increase in the overlap period resulting in a loss of combustion stability under a light load engine opration. Further, as the result of such displacement of the intake port toward the trailing side, the intake port is closed at an early stage so that total charge of intake gas is decreased.

It is therefore an object of the present invention to provide a rotary piston engine including a supercharged intake system which does not have the aforementioned problems.

Another object of the present invention is to provide an intake system for rotary piston engines including supercharging means which does not cause any increase in the resistance of intake gas flow but can provide a satisfactory supercharging effect.

A further object of the present invention is to provide supercharging means which can readily be applied to a multiple rotor type engines.

According to the present invention, in order to accomplish the above and other objects, there is provided a rotary piston engine comprising a casing which includes a rotor housing having an inner wall of trochoidal configuration and a pair of side housings secured to the opposite sides of the rotor housing to define a rotor cavity of trochoidal configuration in the casing, a rotor of polygonal configuration disposed in said rotor cavity for rotation with apex portions in sliding engagement with the inner wall of the rotor housing to define working chambers of which volumes are cyclically changed upon rotation of the rotor, an intake system including main intake port means formed in at least one of said side housings and supercharging port means formed in at least of said side housings, said main and supercharging port means being so formed that they are opened substantially simultaneously and the supercharging port means is closed later than the main intake port means, means for providing a supply of air-fuel mixture to the main intake port means, and means for positively supplying air to the supercharging port means. The main intake port and the supercharging air port may be formed close to each other in the same side housing.

According to the feature of the present invention, since the main intake port means and the supercharging port means are located close to each other in the side housing, it is possible to decrease the overlap with the exhaust port. Further, the port timings are specifically determined as described above to make it possible to provide the supercharging port means with an adequate area without producing a risk of blow back. Therefore, it is possible to provide a satisfactory supercharging effect even with a supercharger of a small capacity without producing any risk of combustion stability under a light load operation.

In actual practice, however, where the supercharger is of an excessively small capacity, the air pressure at the supercharging port means does not become so high, so that there will be a possibility of blow back from the working chamber to the supercharging port means after the main intake port means has been closed. Further, when the main intake port means and the supercharging port means are opened substantially at the same time, there may possibily be a blow back from the supercharging port means to the main intake port means. Such blow back may disturb the intake gas flow in the main intake port means and the result may be such that the charge of relatively warm supercharging air is comparatively increased. Thus, it may become difficult to establish a satisfactory supercharging effect with a small supercharger. Further, where the supercharger is comprised of a vane type air pump which is widely adopted for supplying a secondary air to the exhaust system, the pulsations of the supercharging air may possibly interfere with the intake gas flow from the main intake port means.

Therefore, in accordance with a preferable mode of the present invention, the supercharging port means is associated with timing valve means which is provided with means for opening the valve means when the main intake port means is substantially closed. Further, the valve means may be closed before the supercharging port means is closed to thereby prevent blow back to the supercharging port means. The supercharging port means may further be associated with pressure accumulating chamber means which is located upstream of the timing valve means so that the pressure is accumulated when the valve means is closed.

When the timing valve means is applied to a multiple rotor engine, the valve means may be located at a junction between a supercharging manifold and supercharging branch conduits leading to respective rotor casings so that the manifold is alternately connected with the branch conduits through the valve means. In this instance, the valve means may be so controlled that it connects the manifold with one of the branch conduits when the main intake port means is substantially closed in the rotor casing associated with the one branch conduit.

The above and other objects and features of the present invention will become apparent from the following descriptions of preferred embodiments taking reference to the accompanying drawings, in which;

FIG. 4 is a sectional view similar to FIGS. 1 and 3 but showing a further embodiment; and, FIG. 5 is a diagram showing the port timings in the embodiment of FIG. 4.

Figure 1:
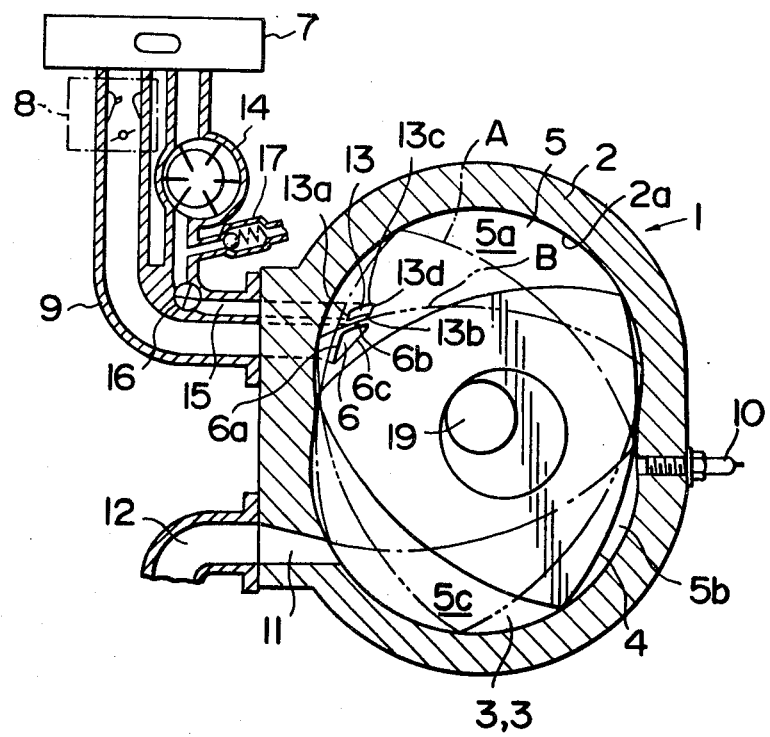
FIG. 1 is a sectional view of a rotary piston engine in accordance with one embodiment of the present invention.

Referring now to the drawings, particularly to FIG. 1, the rotary piston engine shown therein includes a casing 1 comprised of a rotor housing 2 having a trochoidal inner wall 2a and a pair of side housings 3 secured to the opposite sides of the rotor housing 2. In the casing 1, there is disposed a rotor 4 of substantially triangular configuration which is rotatable with apex portions in sliding contact with the inner wall 2a of the rotor housing 2. Thus, there are defined in the casing 1 three working chambers 5a, 5b and 5c by the inner wall 2a of the rotor housing 2 and the flanks of the rotor 4. The volume of each working chamber changes cyclically in response to a rotation of the rotor 4.

One of the side housings 3 is formed with a main intake port 6 which leads from an air cleaner 7 through a carburetor 8 and an intake passage 9. The main intake port 6 is so located that it opens to one of the working chambers during a predetermined period of the rotation of the rotor 4. In the position of the rotor 4 shown by solid lines in FIG. 1, the main intake port 6 is opened to the chamber 5a which is in the intake stroke.

The rotor housing 2 is provided with one or more ignition plugs 10 at the working chamber 5c which is in the compression stroke. Further, the rotor housing 2 is formed with an exhaust port 11 which opens to the exhaust working chamber 5c and leads to an exhaust manifold 12.

The side housing 3 having the main intake port 6 is further formed with a supercharging air port 13 which is located in respect of the direction of rotor rotation at the leading side of the main intake port 6. The port 13 is so formed that it injects supercharging air to the working chamber 5a in axial direction of the rotor 4. The supercharging air port 13 is connected with a supercharging air passage 15 which leads from the air cleaner 7 and has a vane type air pump 14. The passage 15 is further provided with a shut-off valve 16 which is normally open but closed under a light load operation of the engine. Between the air pump 14 and the valve 16, there is provided a pressure relief valve 17 which functions to open the passage 15 to the atmosphere when the air pressure in the passage 15 exceeds a predetermined valve.

The supercharging air port 13 has a radially outboard edge 13a which determines the port opening timing and is so located that the port 13 is opened substantially simultaneously with the main intake port 6. In other words, the edge 13a of the port 13 is located along an extension of the corresponding outboard edge 6a of the main intake port 6, which is drawn substantially along the flank of the rotor immediately before the beginning of the intake stroke as shown by broken lines A. Since the locations of the edges 6a and 13a must be determined taking into consideration the overlap with the exhaust port 11, the edge 13a should be so located that the port 13 is opened substantially at the same time as the main intake port 6 is opened whereby a satisfactory port area can be provided without increasing the overlap.

The supercharging air port 13 also has a trailing edge 13b which is preferably located close to end substantially parallely with the leading edge 6b of the main intake port 6. With this location of the trailing edge 13b, the port 13 is started to be closed immediately after the main intake port 6 has been completed closed by the rotor 4 as shown by broken lines B. The leading edge 13c of the port 13 is substantially parallel with the trailing edge 13b and spaced apart therefrom in such a manner that the port 13 is completely closed when the rotor 4 is rotated 30° to 50° after the main intake port 6 has been completely closed. It is preferable to determine the location of the leading edge 13c so that the port 13 is closed as late as possible provided that the blow back to the port 13 is not produced. In other words, the position of the leading edge 13c should be determined in such a manner that the supercharging air port 13 is completely closed immediately before the pressure in the working chamber increases to the level of the air pressure supplied to the port 13. The inboard edge 13d of the port 13 is located outside the trace of the oil seals on the rotor 4 as in the case of the inboard edge 6d of the main intake port 6.

In operation, as the rotor 4 rotates, the ports 6 and 13 are started to be opened to the working chamber 5a when the rotor 4 is slightly rotated from the position shown by the line A so that the air-fuel mixture from the carburetor 8 is drawn under the suction pressure into the intake working chamber 5a through the main intake port 6 and the supercharging air is forced by the air pump 14 under pressure through the supercharging air port 13. In this instance, a relatively strong suction pressure prevails in the working chamber 5a so that the intake mixture is drawn through the main intake port 6 to produce a steady intake flow. Therefore, there is no risk of blow back of supercharging air to the main intake port 6. When the rotor 4 is further rotated, the openings of the ports 6 and 13 are increased and the pressure in the intake working chamber 5a is increased so that the mixture flow through the main intake port 6 is gradually decreased. However, since the intake mixture flow is maintained through the main intake port 6 under the inertia of the intake mixture, there is no risk that the blow back of supercharging air to the main intake port 6 is produced at this stage of operation. At the bottom dead center position of the rotor 4 wherein the intake working chamber 5a possesses the maximum volume, there will be substantially no mixture flow through the main intake port 6 so that the port 6 is completely closed by the rotor 4 immediately after the bottom dead center as shown by the rotor position B in FIG. 1. By closing the main intake port 6 in this way, it is possible to prevent blow back of the supercharging air to the main intake port 6. Under the light load operation of the engine, there may be a possibility of producing blow back of supercharging air to the main intake port 6 because the inertia of the intake mixture through the main intake port 6 is not large enough to prevent such blow back. However, since the supercharging air passage 15 is closed at this instance by the valve 16, there is no risk that such blow back is produced.

After the main intake port 6 has been closed, the supply of supercharging air is continued through the port 13 until the port 13 is closed. It is therefore possible to provide a sufficient supply of the supercharging air to thereby increase the charging efficiency. In the illustrated arrangement, since the supercharging air port 13 is so formed that it directs the supercharging air to the trailing side of the intake working chamber 5a in the axial direction of the rotor 4, the air-fuel mixture which has already been charged to the intake working chamber 5a is maintained at the leading side of the chamber so that the combustion property can be improved.

Figure 2:
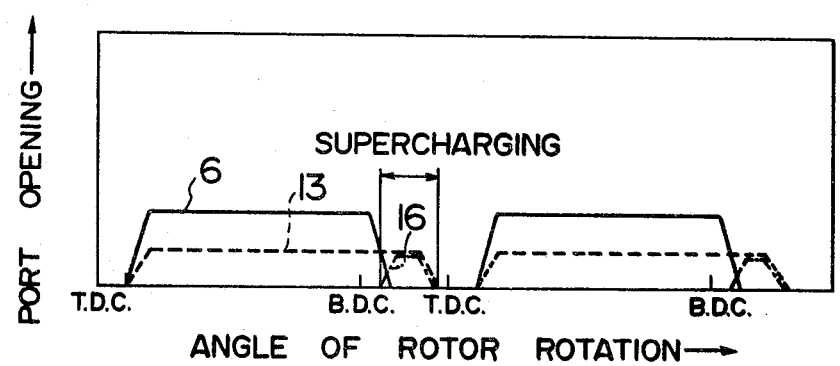
FIG. 2 is a diagram showing the timings of the main intake port and the supercharging port in the embodiment shown in FIG. 3.
Figure 3:
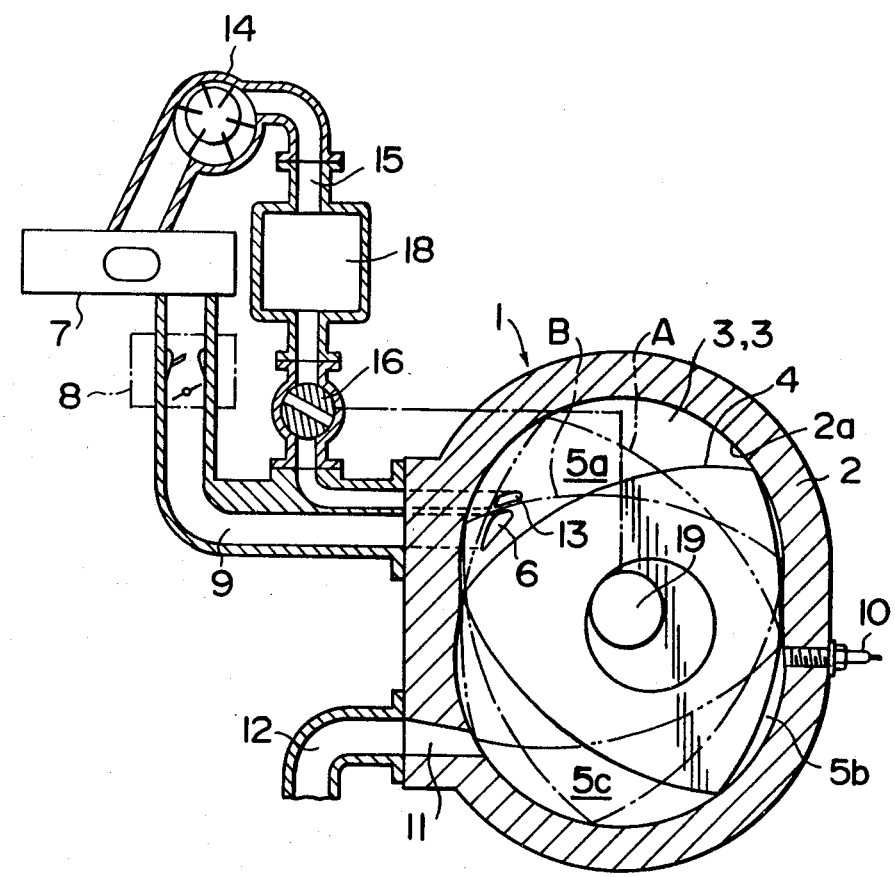
FIG. 3 is a sectional view similar to FIG. 1 but showing another embodiment.

Referring now to FIG. 3, the embodiment shown therein is similar in basic construction with the previous embodiment so that corresponding parts are designated by the same reference numerals as in FIG. 1. In the embodiment of FIG. 3, the supercharging air passage 15 is provided with an air pressure accumulating chamber 18 between the air pump 14 and the valve 16. The chamber 18 functions to smoothen the pulsating pressure from the air pump 14 and accumulate the pressure therein. In this embodiment, the valve 16 is interconnected with the rotor supporting eccentric shaft 19 so that the valve 16 is opened immediately before the main intake port 6 is completely closed as shown in FIG. 2.

In this embodiment, it is also advisable to locate the supercharging air port 13 so that it is opened substantially simultaneously with the main intake port 6. With this arrangement, it is possible to provide a sufficient area of the port 13 without increasing the overlap with the exhaust port. Further, since the supply of supercharging air to the port 13 is cyclically controlled by the valve 16, any blow back of the supercharging air to the main intake port 6 can be prevented. Still further, since supercharging air is supplied only the trailing side of the working charger, stratified charge can be established.

Referring now to FIG. 4, there is shown an embodiment in which the present invention is applied to a two rotor engine. The engine is comprised of a front casing 1F and a rear casing 1R which respectively include rotor housings 2F and 2R having inner walls 2aF and 2aR and paired side housings 3F and 3R secured to the opposite sides of the rotor housings 2F and 2R. In actual practice, the casings 1F and 1R may have one of the side housings in common. In the casings 1F and 1R, there are respectively disposed triangular rotors 4F and 4R which are rotatable with their apex portions in sliding contact with the inner walls 2aF and 2aR, respectively. The basic arrangements of the casings and the rotors are similar to those of the previous embodiments so that corresponding parts are designated by the same reference numerals as in the previous embodiments with addition of characters F for the front casing parts and R for the rear casing parts.

In the illustrated embodiment, the supercharging air passages 15F and 15R are connected through a control valve 20 with a common supercharging air passage 15 which leads to an air cleaner 7 and has an air pump 14 and a pressure accumulating chamber 18. The control valve 20 has valve passages 20f and 20r which serve to connect the common passage 15 respectively with the passages 15F and 15R. The valve 20 may be interconnected with one of the eccentric shafts 19F and 19R to rotate therewith so that the common passage 15 is connected alternately with the passages 15F and 15R when the respective main intake ports 6F and 6R are substantially closed. The port and valve timings are shown in FIG. 5. Further, the common passage 15 is disconnected from the passages 15F and 15R when the ports 13F and 13R are substantially closed. Since the two rotors 4F and 4R are in 180° phase difference, the port timings in the respective rotors are determined in 180° phase difference. Thus, as shown in FIG. 5, the supercharging air is supplied to the front casing 1F when the main intake port 6R in the rear casing 1R is open, and vice versa, however, since the front and rear supercharging air passages 15F and 15R are separated one from the other by the control valve 20, there is no possibility that the supercharging air to be supplied to one casing is also partly directed to the supercharging port of the other casing.

As described previously, it is preferable in order to provide a sufficient area of the supercharging air port to locate the radially outboard edge of the supercharging air port in such a manner that the port is opened substantially simultaneously with the main intake port. Even with such arrangement, since the supercharging air passage to each supercharging air port is maintained closed until the main intake passage is substantially closed, there is no problem of blow back of supercharging air to the main intake passage.

For the purpose of preventing a blow back to the supercharging air port which may be encountered when the supercharging air port is opened until the gas pressure in the intake working chamber has increased above the level of the supercharging air pressure, the control valve may appropriately be closed or the supercharging air port may be properly shaped so that it is closed by the rotor before such blow back is produced. Preferably, the end of the supply of the supercharging air should be managed by the control valve because by doing so it is possible to provide the supercharging air port with a large area. In this instance, however, it is further preferable to locate the control valve as close to supercharging air port as possible so that the dead volume in the air passage can be decreased.

The invention has thus been shown and described with reference to specific embodiments, however, it should be noted that the invention is in no way limited to the details of the illustrated structures but changes and modifications may be made without departing from the scope of the appended claims.

We claim:

1. Rotary piston engine comprising a casing which includes a rotor housing having an inner wall of trochoidal configuration and a pair of side housings secured to the opposite sides of the rotor housing to define a rotor cavity of trochoidal configuration in the casing, a rotor of polygonal configuration disposed in said rotor cavity for rotation with apex portions in sliding engagement with the inner wall of the rotor housing to define working chambers of which volumes are cyclically changed upon rotation of the rotor, an intake system including main intake port means formed in at least one of said side housings and supercharging port means formed in at least one of said side housings, said main and supercharging port means being so formed that they are opened substantially simultaneously and the supercharging port means is closed later than the main intake port means, means for providing a supply of air-fuel mixture to the main intake port means, and means for positively supplying air to the supercharging port means.

2. Rotary piston engine in accordance with claim 1 in which the supercharging port means is associated with timing valve means which is provided with means for opening the valve means when the main intake port means is substantially closed.

3. Rotary piston engine in accordance with claim 2 in which said timing valve means is provided with means for closing the valve means before the supercharging port means is closed to thereby prevent blow back to the supercharging port means.

4. Rotary piston engine in accordance with claim 1 in which said supercharging port means is connected with supercharging passage means which is provided with pressure accumulating chamber means.

5. Rotary piston engine including a first casing which includes a first rotor housing having an inner wall of trochoidal configuration and first side housings secured to the opposite sides of the first rotor housing to define a first rotor cavity of trochoidal configuration in the first casing, a second casing which includes a second rotor housing having an inner wall of trochoidal configuration and second side housings secured to the opposite sides of the second rotor housing to define a second rotor cavity of trochoidal configuration in the second casing, a first and second rotors of polygonal configuration disposed respectively in the first and second rotor cavities for rotation with apex portions in sliding engagement with the inner walls of the first and second rotor housings, respectively, to define working chambes of which volumes are cyclically changed upon rotation of the rotor, an intake system including first main intake port means formed in at least one of the first side housings, second main intake port means formed in at least one of the second side housings, first supercharging port means formed in said one first side housing and located close to said first main intake port means, second supercharging port means formed in said one second side housing and located close to said second main intake port means, said first main and supercharging port means being so formed that they are opened substantially simultaneously and the first supercharging port means is closed later than the first main intake port means, said second main and supercharging port means being so formed that they are opened substantially simultaneously and the second supercharging port means is closed later than the second main intake port means, means for supplying air-fuel mixture to the first and second main intake port means, first and second supercharging passage means connected on one hand respectively with the first and second supercharging port means and on the other hand through control valve means with common passage means which has supercharging means, said control valve means being interrelated with rotation of the rotors so that it connects the common passage means alternately with said first and second supercharging passage means in relation with opening timings of said first and second supercharging port means.

6. Rotary piston engine in accordance with claim 5 in which said control valve means is so formed that it connects the common passage means to one of the first and second supercharging passage means when the associated one of the main intake passage means is substantially closed.

7. Rotary piston engine in accordance with claim 5 in which said common passage means is provided with pressure accumulating chamber means.

8. Rotary piston engine in accordance with claim 1 in which said main intake port means and said supercharging port means are formed in the same side housing and located close to each other.

9. Rotary piston engine in accordance with claim 1 in which said supercharging port is associated with valve means which is adapted to be closed under a light load operation of the engine.

* * * * *